(12) United States Patent
Miyazaki

(10) Patent No.: US 10,859,896 B2
(45) Date of Patent: Dec. 8, 2020

(54) LENS ADJUSTMENT MECHANISM AND PROJECTION-TYPE DISPLAY APPARATUS

(71) Applicant: SONY CORPORATION, Tokyo (JP)

(72) Inventor: Akihiro Miyazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/480,347

(22) PCT Filed: Jan. 11, 2018

(86) PCT No.: PCT/JP2018/000409
§ 371 (c)(1),
(2) Date: Jul. 24, 2019

(87) PCT Pub. No.: WO2018/146985
PCT Pub. Date: Aug. 16, 2018

(65) Prior Publication Data
US 2019/0377249 A1 Dec. 12, 2019

(30) Foreign Application Priority Data
Feb. 8, 2017 (JP) .................................. 2017-021436

(51) Int. Cl.
*G03B 21/14* (2006.01)
*G02B 7/02* (2006.01)
*G03B 5/06* (2006.01)

(52) U.S. Cl.
CPC ............. *G03B 21/142* (2013.01); *G02B 7/02* (2013.01); *G03B 5/06* (2013.01); *G03B 21/145* (2013.01)

(58) Field of Classification Search
CPC .... G03B 21/006; G03B 21/008; G03B 21/28; G03B 21/142; G03B 21/145; G03B 5/02;
(Continued)

(56) References Cited

U.S. PATENT DOCUMENTS

| 2005/0270502 | A1 | 12/2005 | Iinuma | |
| 2010/0053573 | A1* | 3/2010 | Wen | G02B 7/021 353/101 |
| 2014/0333907 | A1* | 11/2014 | Takehana | G02B 27/141 353/101 |

FOREIGN PATENT DOCUMENTS

| JP | 2002-48961 A | 2/2002 |
| JP | 2006-18247 A | 1/2006 |
| JP | 2011-203408 A | 10/2011 |

OTHER PUBLICATIONS

International Search Report dated Apr. 17, 2018 in PCT/JP2018/000409 filed on Jan. 11, 2018.

* cited by examiner

*Primary Examiner* — Sultan Chowdhury
(74) *Attorney, Agent, or Firm* — Oblon, McClelland, Maier & Neustadt, L.L.P.

(57) ABSTRACT

A lens adjustment mechanism according to an embodiment of the present disclosure includes: a base section; a lens holding section that holds a lens having an optical axis in a Z-axis direction; an intermediate member disposed between the base section and the lens holding section; a first rotating cam that is disposed between the base section and the intermediate member, and is rotated about an optical axis of the lens; and a second rotating cam that is disposed between the intermediate member and the lens holding section, and is rotated about the optical axis of the lens. The intermediate member moves in a Y-axis direction together with the lens holding section during rotation of the first rotating cam, and restricts movement in the Y-axis direction of the lens holding section during rotation of the second rotating cam.

14 Claims, 8 Drawing Sheets

(58) Field of Classification Search
CPC ... G03B 5/04; G03B 5/06; G03B 5/08; G02B 7/02; G02B 7/04; G02B 7/021; G02B 7/09; G02B 7/07; G02B 7/102; G02B 7/105

See application file for complete search history.

LENS ADJUSTMENT MECHANISM AND PROJECTION-TYPE DISPLAY APPARATUS

TECHNICAL FIELD

The present disclosure relates to, for example, a lens adjustment mechanism used for adjustment of an optical axis of a lens used for a projection-type display apparatus, and to a projection-type display apparatus using the same.

BACKGROUND ART

Various lenses are disposed in an optical path of light outputted from a light source, in a projection-type display apparatus (a projector) that projects a screen of a personal computer, a video image, etc., onto a screen. In general, a screw mechanism such as a micrometer is used for adjustment of an optical axis deviation of a lens in a plane direction (an XY plane direction) perpendicular to an optical axis of light outputted from a light source. In a case where the micrometer is used for the adjustment of the optical axis, adjustment in an X-axis direction and a Y-axis direction is performed by rotating ratchet stops. The ratchet stops are disposed in respective corresponding directions, i.e., at positions where the directions are orthogonal to each other, which causes an issue that it is difficult to perform operations in a limited space within a housing as in a projection-type display apparatus.

In contrast, for example, PTL 1 discloses a projection lens shift mechanism in which a flange body provided in a columnar lens unit is fixed in a state where the flange body abuts a lens mount body, and two lens shift cams are engaged with each other between the flange body and the lens mount body. In this projection lens shift system, it is possible to perform fine adjustment of a position of a projection lens linearly in only one direction, in one direction or two directions, in such a configuration that an increase in the number of components is minimized.

CITATION LIST

Patent Literature

PTL 1: Japanese Unexamined Patent Application Publication No. 2002-48961

SUMMARY OF THE INVENTION

In this way, for a projection-type display apparatus, development of a lens adjustment mechanism that enables adjustment with higher accuracy is expected.

It is desirable to provide a lens adjustment mechanism and a projection-type display apparatus that enable highly accurate adjustment.

A lens adjustment mechanism according to an embodiment of the present disclosure includes: a base section; a lens holding section that holds a lens having an optical axis in a Z-axis direction; an intermediate member disposed between the base section and the lens holding section; a first rotating cam that is disposed between the base section and the intermediate member, and is rotated about an optical axis of the lens, thereby causing the lens holding section to move in a Y-axis direction; and a second rotating cam that is disposed between the intermediate member and the lens holding section, and is rotated about the optical axis of the lens, thereby causing the lens holding section to move in an X-axis direction. The intermediate member moves in the Y-axis direction together with the lens holding section during rotation of the first rotating cam, and restricts movement in the Y-axis direction of the lens holding section during rotation of the second rotating cam.

A projection-type display apparatus according to an embodiment of the present disclosure includes: a light source section; an image generator that includes a plurality of optical units each including a light modulation element that modulates light from the light source section on the basis of an inputted image signal; and a projection section that projects image light generated in the image generator, and includes, as each of the optical units, the above-described lens adjustment mechanism according to the embodiment of the present disclosure.

In the lens adjustment mechanism and the projection-type display apparatus according to the respective embodiments of the present disclosure, the intermediate member is disposed between the first rotating cam that is rotated about the optical axis of the lens, thereby causing the lens holding section to move in the Y-axis direction and the second rotating cam that is rotated about the optical axis of the lens, thereby causing the lens holding section to move in the X-axis direction. This intermediate member moves in the Y-axis direction together with the lens holding section during the rotation of the first rotating cam, and restricts the movement in the Y-axis direction of the lens holding section during the rotation of the second rotating cam. This makes it possible to perform adjustment in each of the X-axis direction and the Y-axis direction, independently.

According to the lens adjustment mechanism and the projection-type display apparatus in the respective embodiments of the present disclosure, the intermediate member, which moves in the Y-axis direction together with the lens holding section during the rotation of the first rotating cam, and restricts the movement in the Y-axis direction of the lens holding section during the rotation of the second rotating cam, is disposed between the first rotating cam that moves the lens holding section in the Y-axis direction and the second rotating cam that moves the lens holding section in the X-axis direction, and thus adjustment in each of the X-axis direction and the Y-axis direction is independently performed. This makes it possible to perform highly accurate positioning of the lens.

It is to be noted that effects described here are not necessarily limitative, and may be any of effects described in the disclosure.

MODES FOR CARRYING OUT THE INVENTION

Some embodiments of the disclosure are described below in detail with reference to the drawings. It is to be noted that the description is given in the following order.
1. Embodiment (An Example of a Lens Adjustment Mechanism that Adjusts an Optical Axis of a Lens using a Rotating Cam)
   1-1. Configuration of Lens Adjustment Mechanism
   1-2. Operation of Lens Adjustment Mechanism
   1-3. Workings and Effects
2. Application Examples
   2-1. Application Example 1 (An Example of a Projection-Type Display Apparatus using a Reflective Spatial Modulation Element)
   2-2. Modification Example 2 (An Example of a Projection-Type Display Apparatus using a Transmissive Spatial Modulation Element)

1. Embodiment

Figure 1:
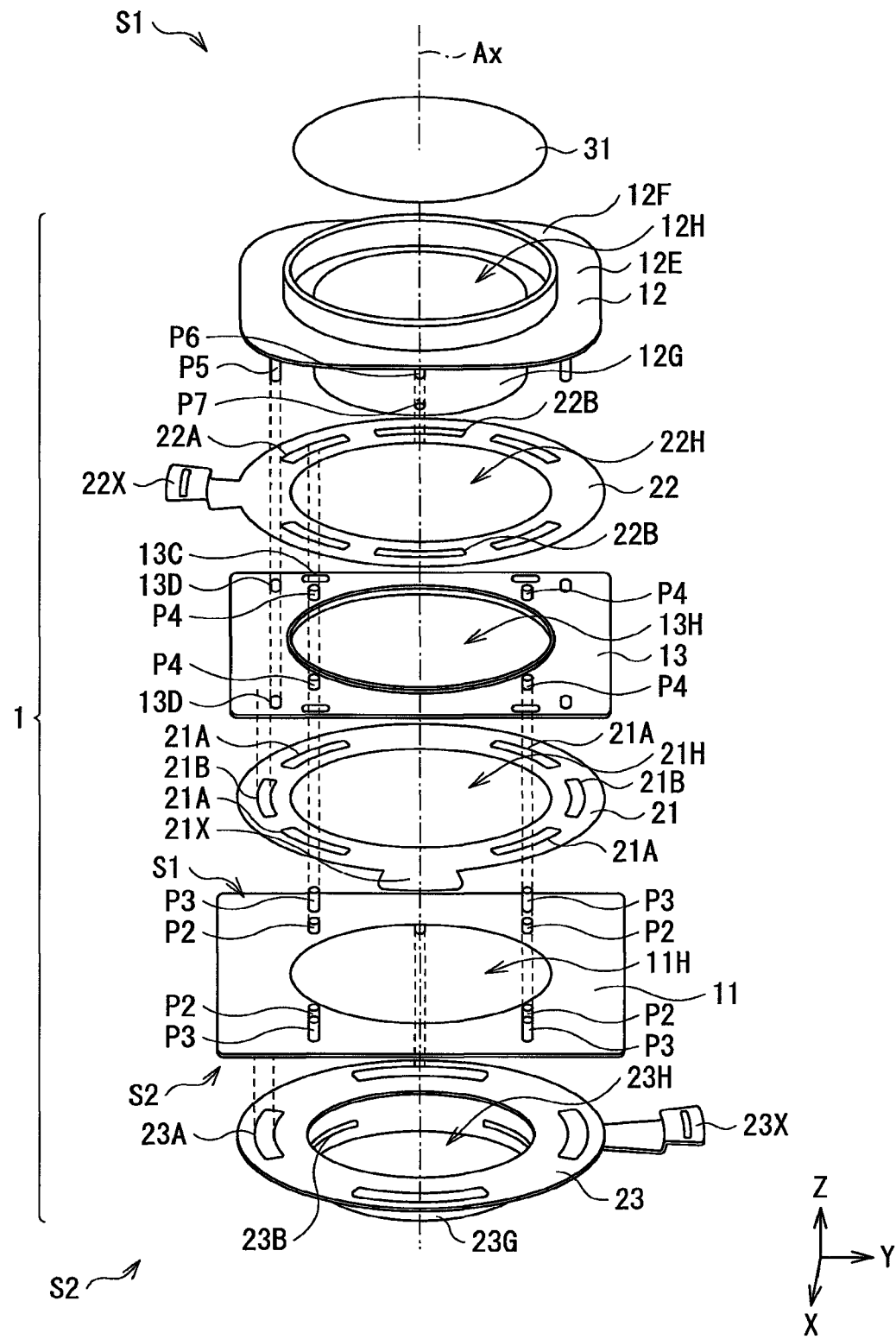
FIG. 1 is an exploded perspective view of a configuration of a lens adjustment mechanism according to an embodiment of the present disclosure.
Figure 2:
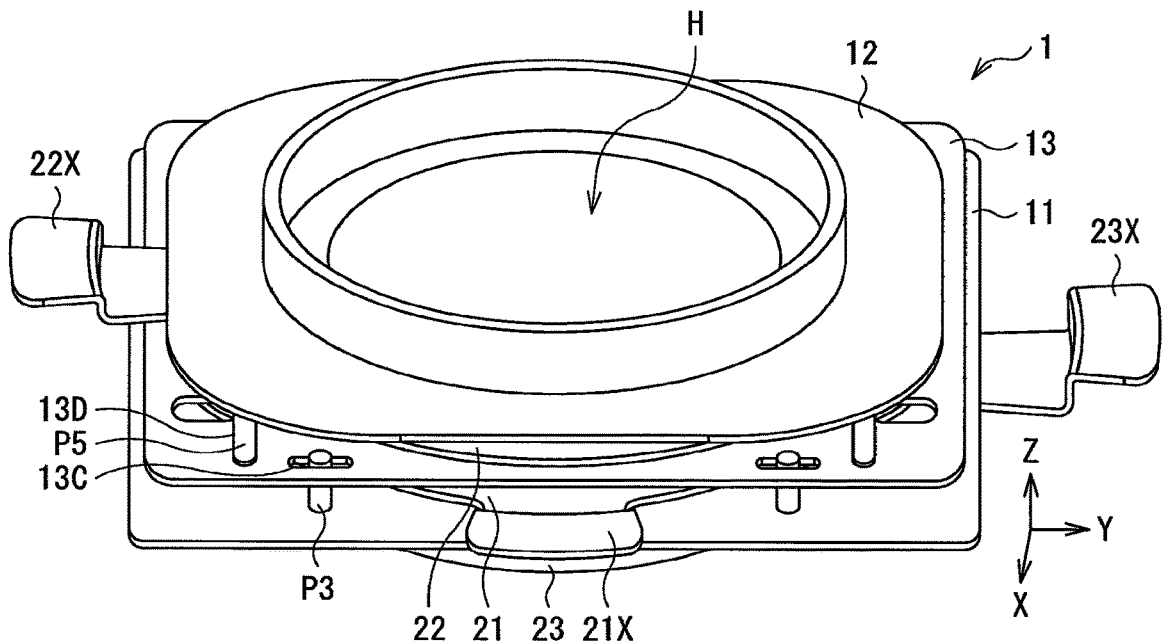
FIG. 2 is a bird's-eye view of the lens adjustment mechanism configured as one unit by combining respective members illustrated in FIG. 1.
Figure 3:
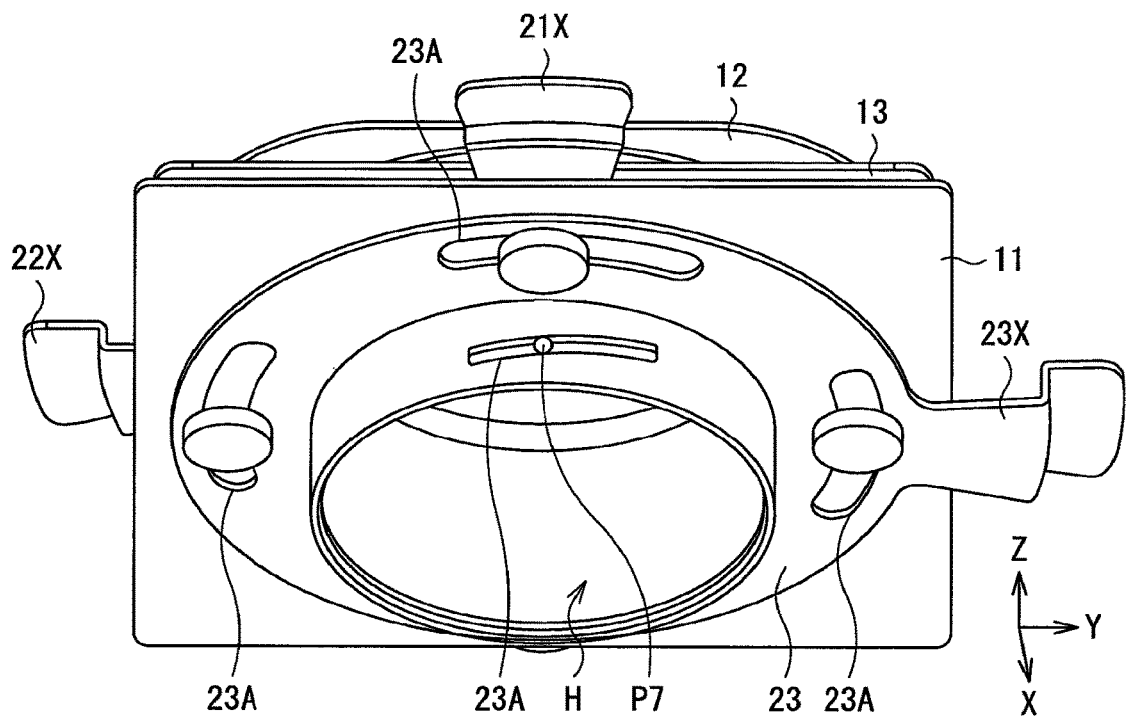
FIG. 3 is a worm's eye view of the lens adjustment mechanism configured as one unit by combining the respective members illustrated in FIG. 1.

FIG. 1 illustrates a lens adjustment mechanism (a lens adjustment mechanism 1) according to an embodiment of the present disclosure, as exploded and viewed perspectively. FIG. 2 illustrates a configuration of the lens adjustment mechanism 1 configured by combining and connecting respective members illustrated in FIG. 1, as viewed from a depression angle direction. FIG. 3 illustrates a configuration of the lens adjustment mechanism 1 configured as one unit by combining the respective members illustrated in FIG. 1, as viewed from an elevation angle direction. This lens adjustment mechanism 1 adjusts, for example, positions of various lenses (e.g., a collimator lens and a fly-eye lens) included in a projection-type display apparatus (e.g., a projector 3, see FIG. 9) described later.

1-1. Configuration of Lens Adjustment Mechanism

The lens adjustment mechanism 1 of the present embodiment has a configuration in which a base section 11, a rotating cam 21, an intermediate member 13, a rotating cam 22, and a lens holding section 12 that holds a lens 31 are disposed in this order. The rotating cam 21 is intended to adjust the lens holding section 12 in a one axis (e.g., a Y-axis) direction, and the rotating cam 22 is intended to adjust the lens holding section 12 in another axis (e.g., a X-axis) direction. The intermediate member 13 is intended to enable movement of the lens holding section 12 by the rotating cam 21 and the rotating cam 22, in each of the Y-axis direction and the X-axis direction, independently. Further, in the lens adjustment mechanism 1, for example, a rotating cam 23 intended to perform positioning in a Z-axis direction is disposed on side (side of a surface S2) opposite to one surface (side of a surface S1) of the base section 11 where each of the above-described members 21, 13, 22, and 12 is disposed.

The base section 11 serves as a reference in a case where the position of the lens 31 is adjusted in the lens adjustment mechanism 1. The base section 11 has, for example, a film thickness (hereinafter referred to simply as a thickness) of 1.5 mm or more and 3 mm or less in the Z-axis direction, and includes, for example, a material having a light blocking property. Specifically, the base section 11 is formed by die casting using aluminum (Al) and magnesium (Mg). It is to be noted that the material of the base section 11 is not limited to nonferrous metal such as the above-described Al and Mg, and, for example, resin, carbon fiber, etc. may be used. The base section 11 is provided with, for example, an opening 11H into which a cylindrical portion 12G of the lens holding section 12 described later is insertable. As described later in detail, for example, eight pins P2 and P3 standing in the Z-axis direction are provided on the side of the surface S1 of the base section 11. Further, for example, four pins P8 similarly standing in the Z-axis direction are provided on the side of the surface S2.

The lens holding section 12 is intended to hold the lens 31 at a position having a certain optical property. The lens holding section 12 includes a flange portion 12E extending in an XY plane direction, a lens mount section 12F provided on one surface of the flange portion 12E, and the cylindrical portion 12G provided on another surface of the flange portion 12E and having, for example, a center near an optical axis Ax of the lens 31. The lens mount section 12F is provided to mount the lens 31. The cylindrical portion 12G is intended to penetrate an opening (each of openings 11H, 21H, 13H, and 22H) provided in each of the base section 11, the rotating cam 21, the intermediate member 13, and the rotating cam 22, in order to integrate the respective members 11, 21, 13, and 22. Although not illustrated, this cylindrical portion 12G is held by the base section 11 in the Z-axis direction. This enables the lens holding section 12 and the lens 31 mounted thereon to move in XYZ directions.

The lens holding section 12 is expected to have some strength to achieve prevention of light leakage and positional accuracy of the lens. For this reason, the lens holding section 12 is formed by die casting using the nonferrous metal such as Al and Mg, and it is preferable that the flange portion 12E have a thickness of, for example, 1.5 mm or more and 3 mm or less. Further, the lens holding section 12 may be formed by using, for example, resin, carbon fiber, etc. as with the above-described base section 11. In the lens holding section 12, for example, eight pins P5 and P6 standing in the Z-axis direction are provided on the side of the surface S2 of the flange portion 12E.

The intermediate member 13 has a degree of freedom in the X-axis direction and the Y-axis direction (the XY plane direction), and is intended to restrict movement in the Y-axis direction of the lens holding section 12 by acting as a base section during rotation of the rotating cam 22. The intermediate member 13 is provided with, for example, the opening 13H into which the cylindrical portion 12G of the lens holding section 12 is insertable. For example, two pins P1 standing in the Z-axis direction are provided on the side of the surface S2 of the intermediate member 13. Further, for example, four pins P4 similarly standing in the Z-axis direction are provided on the side of the surface S1. Furthermore, the intermediate member 13 is provided with, for example, four grooves 13C each having a long axis in the Y-axis direction and four grooves 13D each having a long axis in the X-axis direction. The pins P3 provided on the base section 11 is inserted into the respective grooves 13C. The pins P5 provided on the lens holding section 12 is inserted into the respective grooves 13D. It is to be noted that each of the number of the grooves 13C and the number of the grooves 13D is not necessarily four, and it is sufficient if at least one groove 13C and at least one groove 13D (two in total) are provided at, for example, respective positions opposite each other with the opening 13H interposed therebetween. In a case where two grooves 13C and two grooves 13D are provided, each of the number of the pins P3 inserted in the groove 13C and the number of the pins P5 inserted into the groove 13D may be the same, i.e., two.

The intermediate member 13 includes, for example, a metallic material such as a SUS material, an iron material (such as SPCC), an aluminum material (a sheet material and a die-cast material), and die-cast magnesium. Besides, the intermediate member 13 may include a resin material, specifically, an engineering plastic (engineering plastic) such as polyacetal (POM), ABS, polycarbonate (PC), and Teflon (registered trademark). It is preferable that the intermediate member 13 have a thickness of, for example, 0.8 mm or more and 3 mm or less in a case where the constituent material is the above-described metallic material, and a thickness of, for example, 1 mm or more and 3 mm or less in a case where the constituent material is a resin material.

Figure 4:
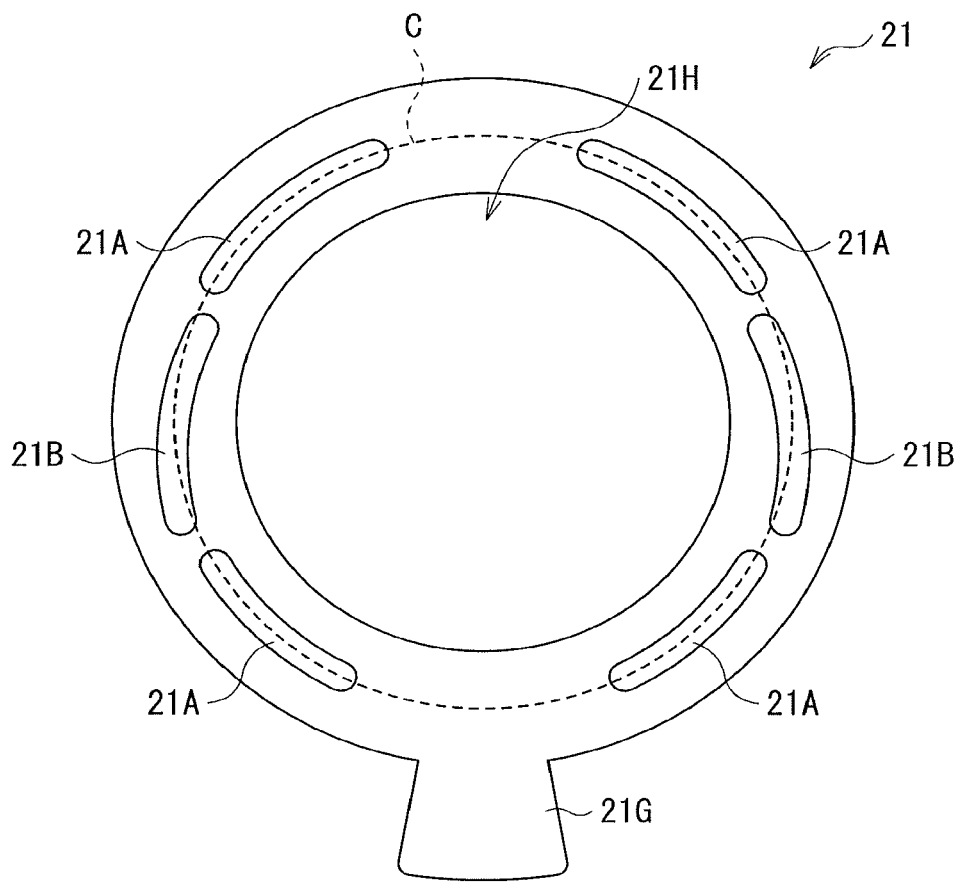
FIG. 4 is a schematic plan view for explanation of a structure of a rotating cam.

The rotating cam 21 is a disk-shaped member having the opening 21H in a central portion. In the rotating cam 21, as illustrated in FIG. 4, a plurality of rotation grooves 21A provided along a circumferential direction (a broken line C) and a plurality of cam grooves 21B inclined with respect to the circumferential direction are provided around the opening 21H. Specifically, one cam groove 21B is provided at each of positions opposite to each other, i.e., two cam grooves 21B are provided in total, and two rotation grooves 21A are provided around the opening 21H with each of the cam grooves 21B interposed therebetween. The pins P2 provided on the base section 11 are inserted into the respective rotation grooves 21A. The pins P1 provided on the intermediate member 13 are inserted into the respective cam grooves 21B. It is to be noted that the number of the rotation grooves 21A provided with each of the cam grooves 21B interposed therebetween is not necessarily two (four in total), and it is sufficient if three rotation grooves 21A are at least provided along the circumferential direction of the opening 21H, at regular intervals, for example. In a case where the number of the rotation grooves 21A is three, the number of the pins P2 inserted into the respective rotation grooves 21A may also be three. Further, in the rotating cam 21, an operation section 21X that rotates the rotating cam 21 is provided at a given position. This operation section 21X may have any shape, but a shape protruding outward along a radial direction is illustrated as an example in FIG. 1, etc. It is to be noted that, here, the circumferential direction indicates a circumferential direction of a circle having, reflective polarizing plate, the optical axis Ax of the lens 31 in an initial state.

The rotating cam 21 includes, for example, a metallic material such as a SUS material, an iron material (such as SPCC), an aluminum material (a sheet material and a die-cast material), and die-cast magnesium. Besides, the rotating cam 21 may include, for example, an engineering plastic such as POM, ABS, PC, and Teflon. It is preferable that the rotating cam 21 have a thickness of, for example, 0.8 mm or more and 3 mm or less in a case where the constituent material is the above-described metallic material, and a thickness of, for example, 1 mm or more and 3 mm or less in a case where the constituent material is a resin material.

The rotating cam 22 is a disk-shaped member having the opening 22H in a central portion. In the rotating cam 22, as with the rotating cam 21 illustrated in FIG. 4, a plurality of rotation grooves 22A provided along the circumferential direction and a plurality of cam grooves 22B inclined with respect to the circumferential direction are provided around the opening 22H. Specifically, one cam groove 22B is provided at each of positions opposite to each other, i.e., two cam grooves 22B are provided in total, and two rotation grooves 22A are provided around the opening 22H with each of the cam grooves 22B interposed therebetween. The pins P4 provided on the intermediate member 13 are inserted into the respective rotation grooves 22A. The pins P6 provided on the lens holding section 12 are inserted into the respective cam grooves 22B. It is to be noted that, as with the rotation grooves 21A, the number of the rotation grooves 22A provided with each of the cam grooves 22B interposed therebetween is not necessarily two (four in total), and it is sufficient if three rotation grooves 22A are at least provided along the circumferential direction of the opening 22H, at regular intervals, for example. In a case where the number of the rotation grooves 22A is three, the number of the pins P2 inserted into the respective rotation grooves 22A may also be three. Further, in the rotating cam 22, an operation section 22X that rotates the rotating cam 22 and, for example, protrudes outward along a radial direction is provided at a given position.

As with the rotating cam 21, the rotating cam 22 includes, for example, a metallic material such as a SUS material, an iron material (such as SPCC), an aluminum material (a sheet material and a die-cast material), and die-cast magnesium. Besides, the rotating cam 21 may include, for example, an engineering plastic such as POM, ABS, PC, and Teflon. It is preferable that the rotating cam 21 have a thickness of, for example, 0.8 mm or more and 3 mm or less in a case where the constituent material is the above-described metallic material, and a thickness of, for example, 1 mm or more and 3 mm or less in a case where the constituent material is a resin material.

The rotating cam 23 is a disk-shaped member having the opening 23H in a central portion. In the rotating cam 23, as with the rotating cam 21 and the like, a plurality of (e.g., four) rotation grooves 32A provided along the circumferential direction are provided at positions opposite to each other, around the opening 23H. The pins P8 provided on the base section 11 are inserted into the respective rotation grooves 23A. It is to be noted that, as with the rotation grooves 21A and 22A, the number of the rotation grooves 23A provided is not necessarily four, and it is sufficient if three rotation grooves 23A are at least provided along the circumferential direction of the opening 23H, at regular intervals, for example. In a case where the number of the rotation grooves 23A is three, the number of the pins P8 inserted into the respective rotation grooves 23A may also be three. Further, in the rotating cam 23, an operation section 23X that rotates the rotating cam 23 and protrudes outward along a radial direction is provided at a given position. Further, in the rotating cam 23, a cylindrical portion 12G is provided in a surface S2 direction. The cylindrical portion 23G has the optical axis Ax of the lens 31 as a center, and the cylindrical portion 12G of the lens holding section 12 is inserted into the cylindrical portion 23G Three cam grooves 23B inclined in the Z-axis direction and having, for example, the same inclination are provided on a cylindrical surface of the cylindrical portion 23G Pins P7 provided on the cylindrical portion 12G of the lens holding section 12 are inserted into the respective cam grooves 23B.

As with the rotating cams 21 and 22, the rotating cam 23 includes, for example, a metallic material such as a SUS material, an iron material (such as SPCC), an aluminum material (a sheet material and a die-cast material), and die-cast magnesium. Besides, the rotating cam 23 may include, for example, an engineering plastic such as POM, ABS, PC, and Teflon. It is preferable that the rotating cam 23 have a thickness of, for example, 0.8 mm or more and 3 mm or less in a case where the constituent material is the above-described metallic material, and a thickness of, for example, 1 mm or more and 3 mm or less in a case where the constituent material is a resin material.

It is to be noted that in the lens adjustment mechanism 1 of the present embodiment, although not illustrated, the respective members (the base section 11, the lens holding section 12, the intermediate member 13, and the rotating cams 21, 22, and 23) are integrated by being pressed in the Z-axis direction through use of, for example, a cam lever. In addition, the respective members may be integrated by using, for example, the following method. First, one or a plurality of fixing spirals each having a gear at a head portion (screws with gear) is prepared. A spiral (a screw hole) that tightens the fixing spiral is provided at an appropriate position in the base section 11, and a hole having a size large enough not to affect a movement operation of the fixing spiral is provided, in the lens holding section 12, at a position corresponding to the spiral provided in the base section 11. Further, a rotation fixing lever having a degree of rotational freedom similar to that of a rotating cam is installed at, for example, a gear of a rotation spiral. In a case where the fixing spiral is inserted into the hole provided in the lens holding section 12, and further, an operation section of the rotation fixing lever is positioned at the spiral provided in the base section 11 and rotated, the rotation of the operation section of the rotation fixing lever is transmitted to the fixing spiral by a gear set in the rotation fixing lever. This presses the lens holding section 12 against the base section 11, and thereby integrates the respective members (the base section 11, the lens holding section 12, the intermediate member 13, and the rotating cams 21, 22, and 23). It is to be noted that in a case where a plurality of fixing spirals is provided, there is apprehension about phase shift and backlash between the respective fixing spirals, but these are dissolved by making an adjustment between a gear portion and a screw portion of the fixing spiral.

1-2. Operation of Lens Adjustment Mechanism

Next, an operation of the lens adjustment mechanism 1 is described.

Figure 5:
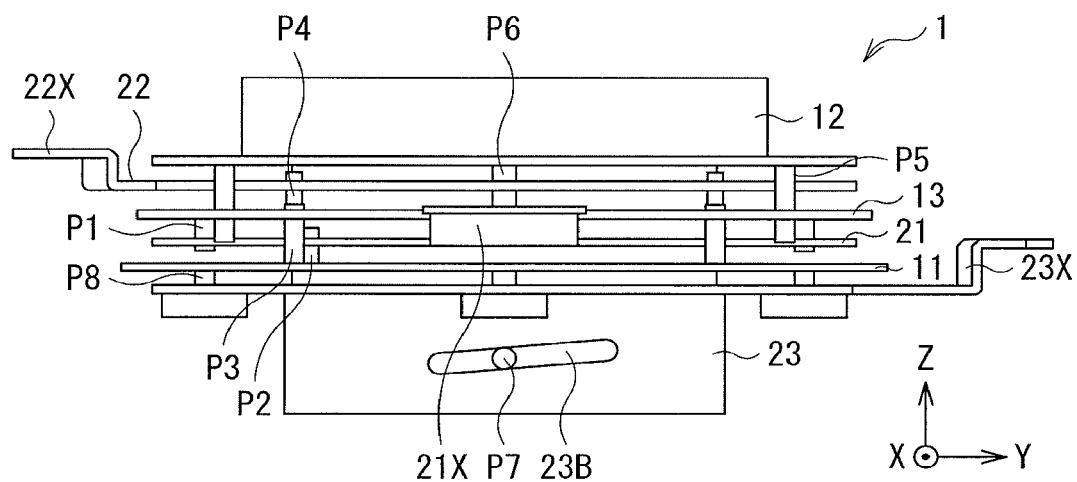
FIG. 5 illustrates the lens adjustment mechanism configured as one unit by combining the respective members illustrated in FIG. 1, as viewed from a lateral direction.

The base section 11, the lens holding section 12, and the intermediate member 13 are provided with the plurality of pins P1 to P8, as described above. Further, the intermediate member 13 and the rotating cams 21, 22, and 23 are provided with the grooves 13C and 13D, the rotation grooves 21A, 22A, and 23A, and the cam grooves 21B, 22B, and 23B to be combined with the corresponding pins P1 to P8. FIG. 5 illustrates the lens adjustment mechanism 1 as viewed from a lateral direction, in order to explain a positional relationship between each of the pins P1 to P8, and a corresponding one of the grooves 13C and 13D, the rotation grooves 21A, 22A, and 23A, and the cam grooves 21B, 22B, and 23B. It is to be noted that, here, the overlapping pins P1 to P8 are omitted where appropriate, for easy understanding of each of the relationships.

The pins P1 to P8 provided on the base section 11, the lens holding section 12, and the intermediate member 13 each penetrate a corresponding one of the grooves (the grooves 13C and 13D, the rotation grooves 21A and 22A, and the cam grooves 21B and 22B) provided on the intermediate member 13 and the rotating cams 21 and 22.

Figure 6:
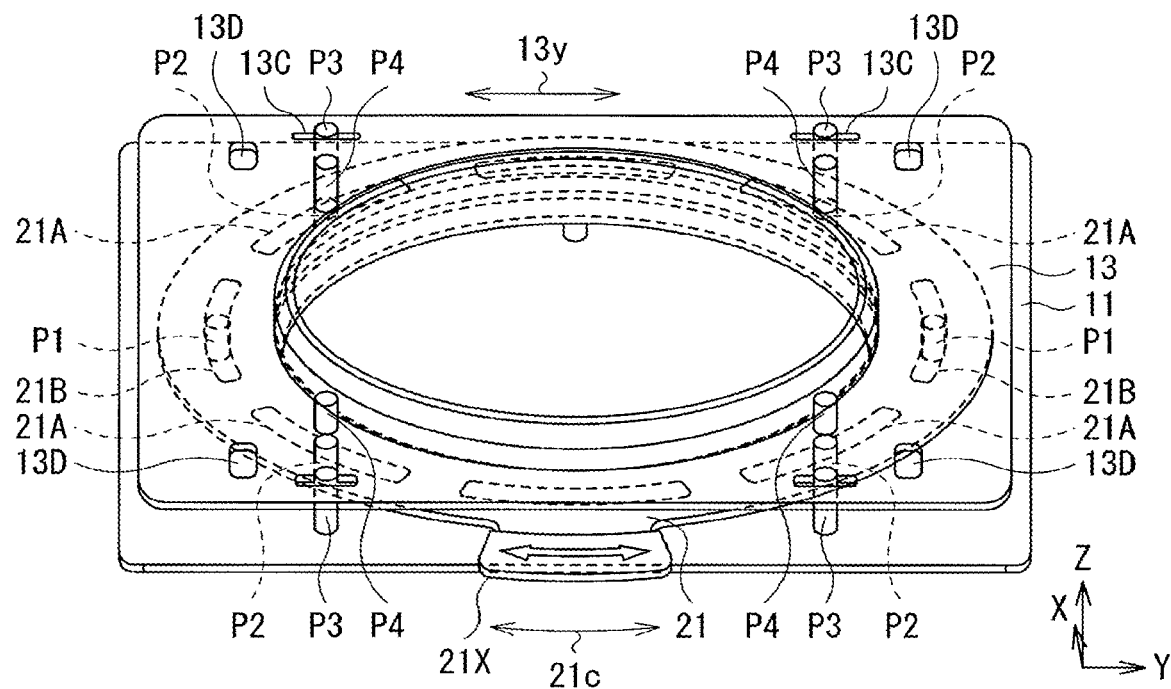
FIG. 6 is a schematic diagram for explanation of an operation in adjustment in a Y-axis direction of the lens adjustment mechanism illustrated in FIG. 1.

Specifically, the pin P2 provided on the base section 11 penetrates the rotation groove 21A of the rotating cam 21, and holds the rotation center of the rotating cam 21 in a position near the optical axis Ax. The pin P3 provided on the base section 11 penetrates the groove 13C provided on the intermediate member 13 and having the long axis in the Y-axis direction, and holds movement in the Y-axis direction of the intermediate member 13 while restricting movement in the X-axis direction of the intermediate member 13. The pin P1 provided on the side of the surface S2 of the intermediate member 13 penetrates the cam groove 21B of the rotating cam 21. The cam groove 21B is intended to guide the movement in the Y-axis direction of the intermediate member 13. The above-described configuration causes the operation section 21X to move in an arrow $21c$ direction, thereby rotating the rotating cam 21, which causes the intermediate member 13 to move in parallel with an arrow $13y$ direction (the Y-axis direction), as illustrated in FIG. 6. At this moment, the movement in the X-axis direction of the intermediate member 13 is restricted by the groove 13C. It is to be noted that the rotating cam 21 rotates in the plane (the XY plane) direction perpendicular to the optical axis Ax (the Z-axis direction) of the lens 31.

Figure 7:
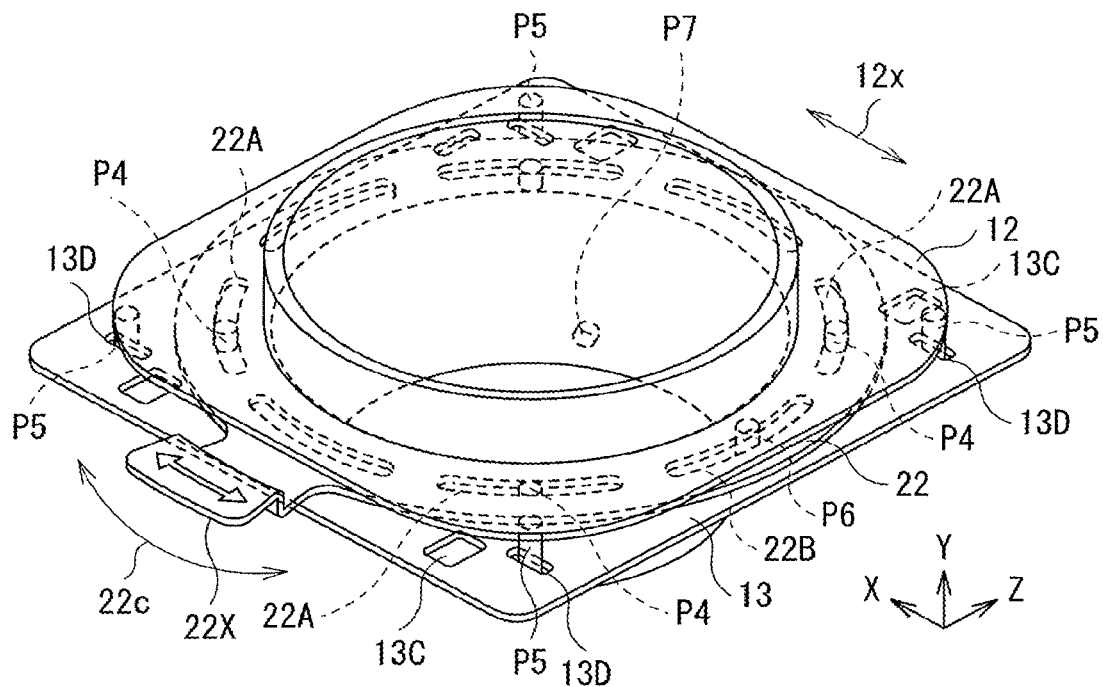
FIG. 7 is a schematic diagram for explanation of an operation in adjustment in an X-axis direction of the lens adjustment mechanism illustrated in FIG. 1.

The pin P4 provided on the side of the surface S1 of the intermediate member 13 penetrates the rotation groove 22A of the rotating cam 22 and holds the rotation center of the rotating cam 21 in a position near the optical axis Ax. The pin P5 provided on the side of the surface S2 of the lens holding section 12 penetrates the groove 13D provided in the intermediate member 13 and having the long axis in the X-axis direction, and holds the movement in the X-axis direction while restricting the movement of the intermediate member 13 in the Y-axis direction of the intermediate member 13. The pin P6 provided on the side of the surface S2 of the lens holding section 12 penetrates the cam groove 22B of the rotating cam 22. This cam groove 22B is intended to guide the movement in the X-axis direction of the intermediate member 13. The above-described configuration causes the operation section 22X to move in an arrow $22c$ direction, thereby rotating the rotating cam 22, which causes the lens holding section 12 to move in parallel with an arrow $12x$ direction (the X-axis direction), as illustrated in FIG. 7. At this moment, the movement in the Y-axis direction of the lens holding section 12 is restricted by the groove 13D. It is to be noted that the rotating cam 22 rotates in the plane (the XY plane) direction perpendicular to the optical axis Ax (the Z-axis direction) of the lens 31, as with the rotating cam 21.

Figure 8:
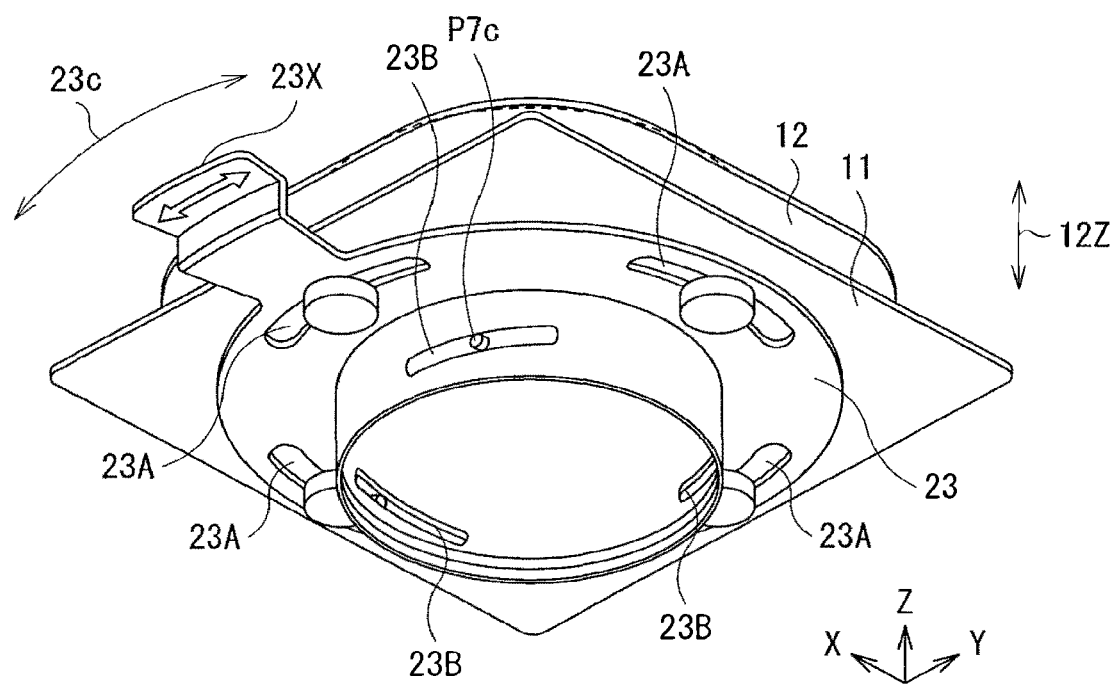
FIG. 8 is a schematic diagram for explanation of an operation in adjustment in a Z-axis direction of the lens adjustment mechanism illustrated in FIG. 1.

Further, the lens holding section 12 is provided with, for example, the three pins P7, on a cylindrical surface of the cylindrical portion 12G. This pin P7 penetrates the cam groove 23B provided in the cylindrical portion 23G of the rotating cam 23. In addition, for example, the four pins P8 are provided on the side of the surface S2 of the base section 11. This pin P8 penetrates the rotation groove 23A of the rotating cam 23 and holds the rotation center of the rotating cam 23 in a position near the optical axis Ax. The above-described configuration causes the operation section 23X to move in an arrow $23c$ direction, thereby rotating the rotating cam 23, which causes the lens holding section 12 to move in parallel with an arrow 12z direction (the Z-axis direction), as illustrated in FIG. 8.

It is to be noted that the movement in the Y-axis direction of the lens holding section 12 is also enabled by providing a circular sliding portion in each of the opening 21H of the rotating cam 21 and the opening 11H of the base section 11. The movement in the X-axis direction of the rotating cam 22 of the lens holding section 12 is also enabled by providing a circular sliding portion in each of the opening 22H of the rotating cam 22 and the opening 13H of the intermediate member 13.

1-3. Workings and Effects

As described above, for example, for a projection-type display apparatus, development of a lens adjustment mechanism that enables highly accurate positioning of a lens is expected, and for example, a lens adjustment mechanism that adjusts a position of a projection lens using a cam has been proposed. In this lens adjustment mechanism, two cams that shift the lens in each of an X-axis direction and a Y-axis direction are fixed in a state of abutting each other between a flange body provided in a columnar lens unit and a lens mount body, and positioning of the projection lens is thereby performed. However, in the lens adjustment mechanism having the above-described configuration, there is a possibility that a rotation axis deviates and the lens thereby moves in an unintended direction in a case where one of the cams is moved, due to wobbling of an operation section, or a pressure angle or friction of the cams.

In the lens adjustment mechanism 1 of the present embodiment, the intermediate member 13 is disposed between the rotating cam 21 that moves the lens holding section 12 in the Y-axis direction and the rotating cam 22 that moves the lens holding section 12 in the X-axis direction. The intermediate member 13 is provided with the grooves 13C and 13D having the long axis in the Y-axis direction or the X-axis direction, and the pin P3 provided on the base section 11 is inserted into the groove 13C, while the pin P5 provided on the lens holding section 12 is inserted into the groove 13D. The lens holding section 12 thereby horizontally moves in the Y-axis direction together with the intermediate member 13 in a case where the rotating cam 21 is rotated. In a case where the rotating cam 22 is rotated, the movement in the Y-axis direction of the lens holding section 12 is restricted by the intermediate member 13, and the lens holding section 12 horizontally moves only in the X-axis direction. In other words, it is possible to perform positioning of the lens 31 independently in each of the X-axis direction and the Y-axis direction, for example, linearly.

As described above, in the present embodiment, the intermediate member 13, which moves in the Y-axis direction together with the lens holding section during the rotation of the rotating cam 21, and restricts the movement in the Y-axis direction of the lens holding section 12 during the rotation of the rotating cam, is disposed between the rotating cam 21 that moves the lens holding section 12 in the Y-axis direction and the rotating cam 22 that moves the lens holding section 12 in the X-axis direction. The adjustment in each of the X-axis direction and the Y-axis direction is thereby performed independently, and it is possible to perform positioning of the lens 31 in the XY plane direction with accuracy.

Further, in the present embodiment, the lens position is adjusted by using the cam, which makes it possible to perform fine positioning of the lens 31 by an operation of a large stroke. Furthermore, as compared with the above-described lens adjustment mechanism using a screw mechanism such as a micrometer, a simple configuration is achievable, which makes it possible to reduce the number of components and reduce cost.

Moreover, the rotating cams 21 and 22 that rotate about the optical axis Ax of the lens 31 are used, which makes it possible to freely set a displacement of a point of effort a displacement of a point of action. It is therefore possible to freely set the position of each of the operation sections 21X and 22X of the rotating cams 21 and 22, by providing the adjustment in the X-axis direction and the adjustment in the Y-axis direction with the axis of the same vector. This makes it possible to dispose each of the operation sections 21X and 22X of the two rotating cams 21 and 22 at a desirable position, thereby improving operability.

It is to be noted that, in the present embodiment, the rotating cams 21 and 22 are operated by using the operation sections 21X and 22X provided on the rotating cams 21 and 22, but it is possible to operate each of the rotating cams 21 and 22 from a distant position by, for example, providing a gear or a motor in each of the rotating cams 21 and 22.

2. Application Examples 2-1. Application Example 1

Figure 9:
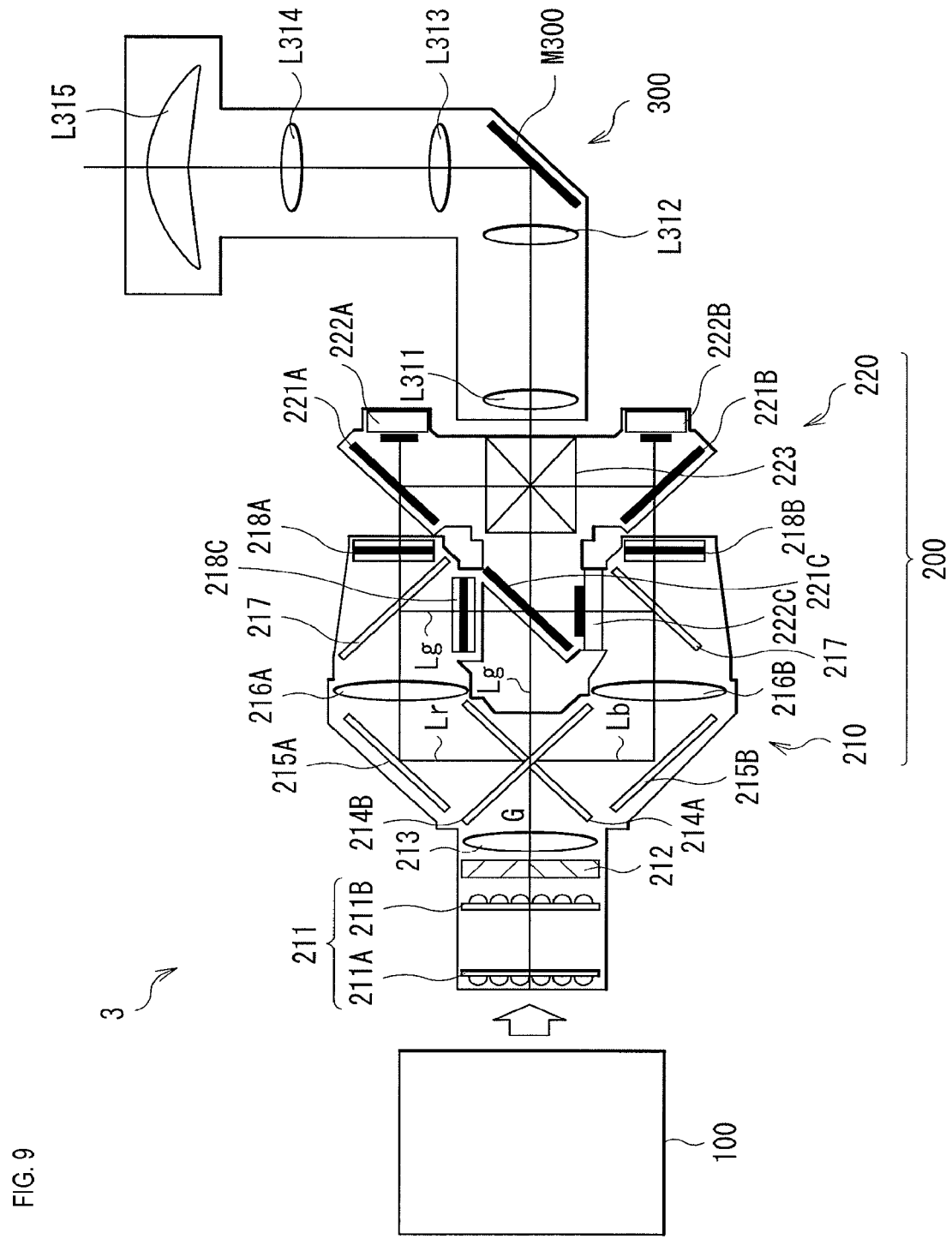
FIG. 9 is a schematic diagram illustrating an example of a configuration of an optical system of a projection-type display apparatus according to an embodiment of the present disclosure.

FIG. 9 exemplifies a 3LCD reflective projection-type display apparatus (the projector 3) performing optical modulation by using a reflective liquid crystal panel. This projector 3 includes, as described above, a light source optical system 100, an image generation system 200 including an illumination optical system 210 and an image generator 220, and a projection optical system 300. It is to be noted that the projector 3 of the present disclosure is also applicable to a projector that uses a transmissive liquid crystal panel, a digital micro-mirror device (DMD: Digital Micro-mirror Device), or the like, in place of a reflective liquid crystal panel.

Figure 10:
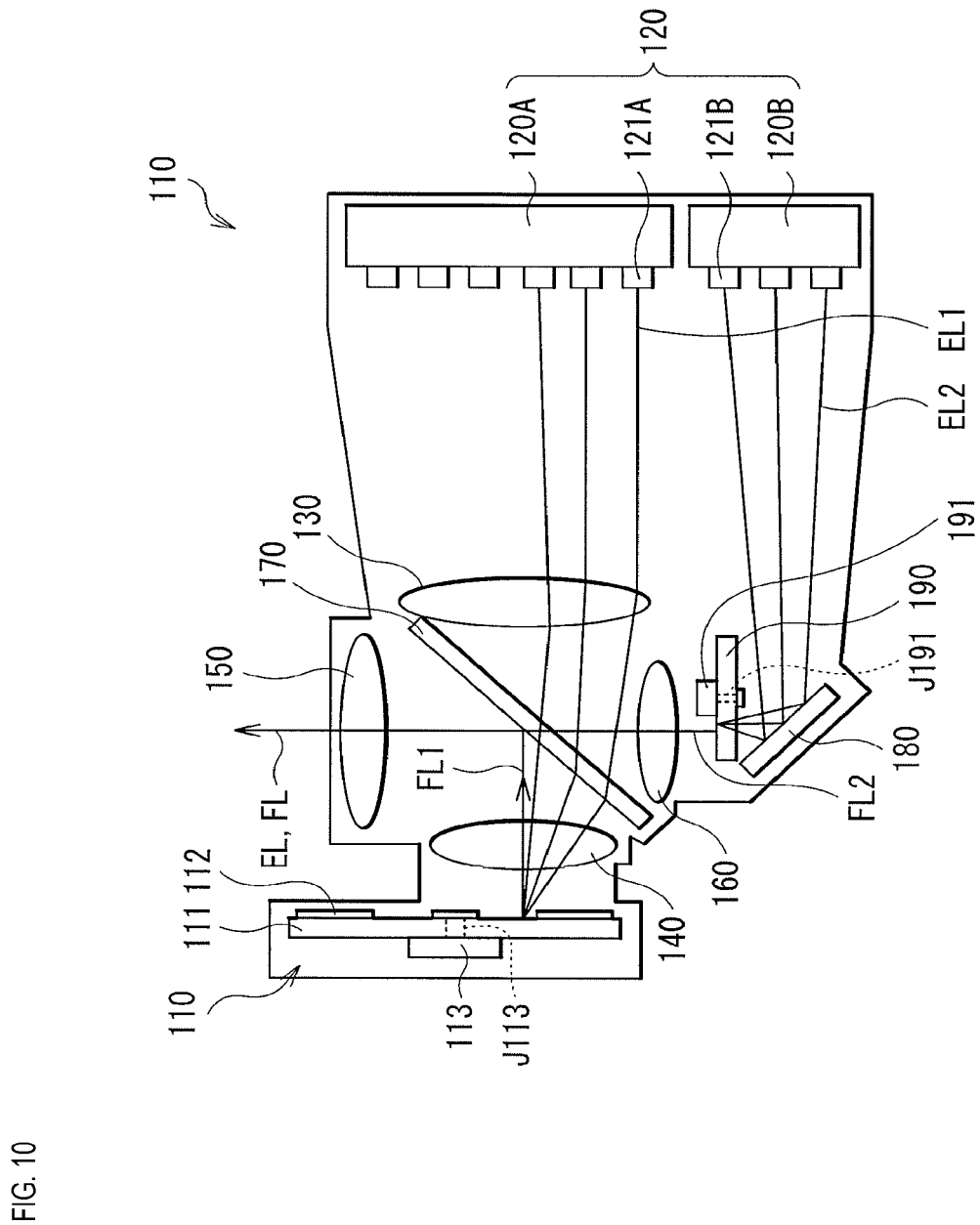
FIG. 10 is a schematic diagram illustrating a configuration example of a light source optical system illustrated in FIG. 9.

The light source optical system 100 includes a phosphor wheel 110 (a wavelength converter), a light source section 120 that emits exciting light or laser light, lenses 130 to 160, a dichroic mirror 170, a reflecting mirror 180, and a diffusion plate 190, as illustrated in FIG. 10. The phosphor wheel 110 has, for example, a configuration in which a phosphor layer 112 is provided on a substrate 111 on a disc, and is rotatably supported by a shaft J113. The diffusion plate 190 is rotatably supported by a shaft J191. The light source section 120 includes a first laser group 120A and a second laser group 120B. The first laser group 120A includes a plurality of semiconductor laser devices 121A that is arrayed and oscillates exciting light (e.g., a wavelength of 445 nm or 455 nm), and the second laser group 120B includes a plurality of semiconductor laser devices 121B that is arrayed and oscillates blue laser light (e.g., a wavelength of 465 nm). Here, the exciting light oscillated from the first laser group 120A is denoted by EL1 and the blue laser light (hereinafter simply referred to as the blue light) oscillated from the second laser group 120B is denoted by EL2, for convenience.

The illumination optical system 210 includes, for example, fly-eye lenses 211 (211A and 211B), a polarization conversion element 212, a lens 213, dichroic mirrors 214A and 214B, reflecting mirrors 215A and 215B, lenses 216A and 216B, a dichroic mirror 217, and polarizing plates 218A to 218C, from a position close to the light source optical system 100.

The fly-eye lenses 211 (211A and 211B) are intended to homogenize illumination distribution of white light from the lens 150 of the light source optical system 100. The polarization conversion element 212 serves to align a polarization axis of incident light in a predetermined direction, and converts, for example, light except for P-polarized light into P-polarized light. The lens 213 condenses light from the polarization conversion element 212 toward the dichroic mirrors 214A and 214B. The dichroic mirrors 214A and 214B selectively reflect light in a predetermined wavelength region and selectively allow light in a wavelength region other than the predetermined wavelength region to pass therethrough. For example, the dichroic mirror 214A mainly reflects red light in a direction toward the reflecting mirror 215A. Further, the dichroic mirror 214B mainly reflects blue light in a direction toward the reflecting mirror 215B. Hence, mainly green light passes through both of the dichroic mirrors 214A and 214B, and travels toward a reflective polarizing plate 221C (described later) of the image generator 220. The reflecting mirror 215A reflects light (mainly, red light) from the dichroic mirror 214A toward the lens 216A, and the reflecting mirror 215B reflects light (mainly, blue light) from the dichroic mirror 214B toward the lens 216B. The lens 216A allows light (mainly, red light) from the reflecting mirror 215A to pass therethrough, and condenses the light on the dichroic mirror 217. The lens 216B allows light (mainly, blue light) from the reflecting mirror 215B to pass therethrough, and condenses the light on the dichroic mirror 217. The dichroic mirror 217 selectively reflects green light, and selectively allows light in a wavelength region other than the green light to pass therethrough. Here, a red light component of the light from the lens 216A passes through. In a case where a green light component is included in the light from the lens 216A, the green light component is reflected toward the polarizing plate 218C. The polarizing plates 218A to 218C include a polarizer having a polarization axis in a predetermined direction. For example, in a case where conversion into P-polarized light is performed in the polarization conversion element 212, the polarizing plates 218A to 218C allow the P-polarized light to pass therethrough, and reflect S-polarized light.

The image generator 220 includes reflective polarizing plates 221A to 221C, reflective liquid crystal panels 222A to 222C (spatial modulation elements), and a dichroic prism 223.

The reflective polarizing plates 221A to 221C each allow light (e.g., P-polarized light) of the same polarization axis as the polarization axis of polarized light from a corresponding one of the polarizing plates 218A to 218C to pass therethrough, and each reflect light (S-polarized light) of other polarization axes. Specifically, the reflective polarizing plate 221A allows red light of the P-polarized light from the polarizing plate 218A to pass therethrough toward the reflective liquid crystal panel 222A. The reflective polarizing plate 221B allows blue light of the P-polarized light from the polarizing plate 218B to pass therethrough toward the reflective liquid crystal panel 222B. The reflective polarizing plate 221C allows green light of the P-polarized light from the polarizing plate 218C to pass therethrough toward the reflective liquid crystal panel 222C. Further, the green light of the P-polarized light having passed through both of the dichroic mirrors 214A and 214B to enter the reflective polarizing plate 221C passes through the reflective polarizing plate 221C as-is to enter the dichroic prism 223. Furthermore, the reflective polarizing plate 221A reflects the red light of the S-polarized light from the reflective liquid crystal panel 222A, thereby causing the red light to enter the dichroic prism 223. The reflective polarizing plate 221B reflects the blue light of the S-polarized light from the reflective liquid crystal panel 222B, thereby causing the blue light to enter the dichroic prism 223. The reflective polarizing plate 221C reflects the green light of the S-polarized light from the reflective liquid crystal panel 222C, thereby causing the green light to enter the dichroic prism 223.

The reflective liquid crystal panels 222A to 222C each perform spatial modulation of red light, blue light, or green light.

The dichroic prism 223 combines the incident red light, blue light, and green light, and outputs thus-combined light toward the projection optical system 300.

The projection optical system 300 includes lenses L311 to L315 and a mirror M300. The projection optical system 300 enlarges light outputted from the image generator 220 and projects the enlarged light onto a screen 600 or the like.

Next, an operation of the projector 3 is described.

First, in the light source optical system 100, motor sections 113 and 119 are driven to rotate the phosphor wheel 110 and the diffusion plate 190. Thereafter, the exciting light EL1 and the laser light EL2 are respectively oscillated from the first laser group 120A and the second laser group 120B in the light source section 120.

The exciting light EL1 is oscillated from the first laser group 120A, passes through the lens 130, the dichroic mirror 170, and the lens 140 sequentially, and then is applied to the phosphor layer 112 of the phosphor wheel 110. The phosphor layer 112 of the phosphor wheel 110 absorbs a portion of the exciting light EL1, converts the absorbed portion into fluorescence FL1 that is yellow light, and outputs this fluorescence FL1 toward the lens 140. The fluorescence FL1 is reflected by the dichroic mirror 170, and then passes through the lens 150, and travels toward the illumination optical system 210.

The laser light EL2 is oscillated from the second laser group 120B, and is applied to the diffusion plate 190 through the reflecting mirror 180. The diffusion plate 190 diffuses the laser light EL2 and outputs the laser light EL2 toward the lens 160. The laser light EL2 passes through the dichroic mirror 170, and then passes through the lens 150 and travels toward the illumination optical system 210.

In this way, the light source optical system 100 allows white light formed by combining the fluorescence FL (FL1) that is yellow light and the laser light (EL2) of blue color to enter the illumination optical system 210.

The white light from the light source optical system 100 passes through the fly-eye lenses 211 (211A and 211B), the polarization conversion element 212, and the lens 213 sequentially, and then arrives at the dichroic mirrors 214A and 214.

Red light Lr included in the white light is reflected mainly by the dichroic mirror 214A, and this red light Lr passes through the reflecting mirror 215A, the lens 216A, the dichroic mirror 217, the polarizing plate 218A, and the reflective polarizing plate 221A sequentially, and arrives at the reflective liquid crystal panel 222A. This red light Lr is subjected to spatial modulation in the reflective liquid crystal panel 222A, and then reflected by the reflective polarizing plate 221A to enter the dichroic prism 223. It is to be noted that in a case where a green light component (Lg) is included in light reflected by the dichroic mirror 214A toward a reflecting mirror 250A, the green light component (Lg) is reflected by the dichroic mirror 217 and passes through the polarizing plate 218C and the reflective polarizing plate 221C sequentially to arrive at the reflective liquid crystal panel 222C. Mainly blue light Lb included in the white light is reflected by the dichroic mirror 214B and enters the dichroic prism 223 after undergoing a similar process. Green light Lg having passed through the dichroic mirrors 214A and 214 also enters the dichroic prism 223.

The red light Lr, the blue light Lb, and the green light Lg incident on the dichroic prism 223 are combined and then outputted toward the projection optical system 300 as image light. The projection optical system 300 enlarges the image light from the image generator 220 and projects the enlarged light onto the screen 600 or the like.

2-2. Application Example 2

Figure 11:
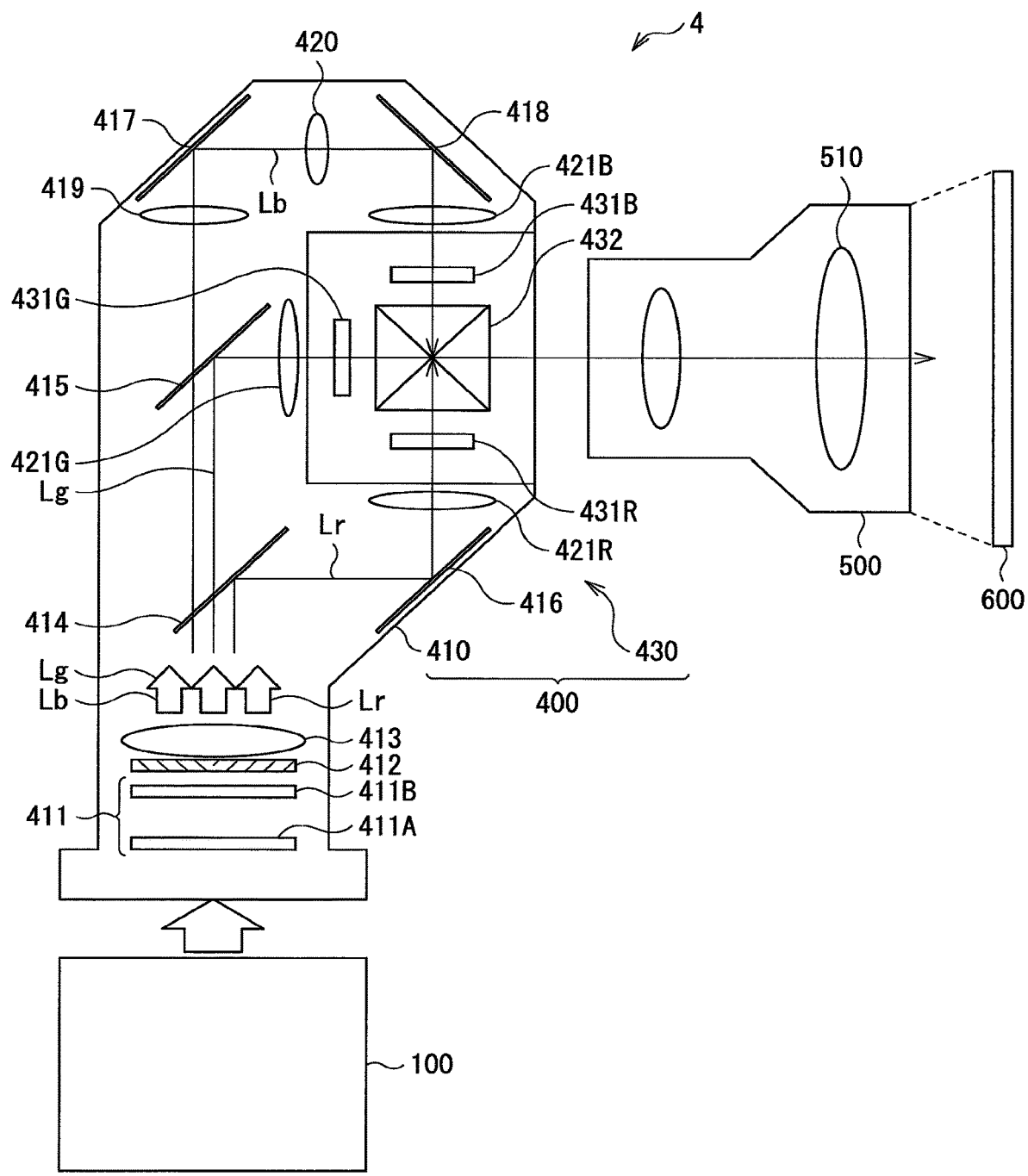
FIG. 11 is a schematic diagram illustrating another example of a configuration of an optical system of a projection-type display apparatus according to an embodiment of the present disclosure.

FIG. 11 is a schematic diagram illustrating an example of a configuration of a 3LCD transmissive projection-type display apparatus (a projector 4) performing optical modulation by using a transmissive liquid crystal panel. This projector 4 includes, for example, the light source optical system 100, an image generation system 400 including an illumination optical system 410 and an image generator 430, and a projection optical system 500. It is to be noted that the light source optical system 100 has a configuration similar to that of the light source optical system 100 in the above-described application example 1.

The illumination optical system 410 includes, for example, an integrator element 411, a polarization conversion element 412, and a condensing lens 413. The integrator element 411 includes a first fly-eye lens 411A and a second fly-eye lens 411B. The first fly-eye lens 411A includes a plurality of microlenses that is two-dimensionally arrayed, and the second fly-eye lens 411B includes a plurality of microlenses that is arrayed in one-to-one correspondence with the microlenses of the first fly-eye lens 411A.

Light (parallel light) incident on the integrator element 411 from the light source optical system 100 is divided into a plurality of light fluxes by the microlenses of the first fly-eye lens 411A to be imaged on the corresponding microlenses in the second fly-eye lens 411B. Each of the microlenses of the second fly-eye lens 411B serves as a secondary light source, and applies a plurality of parallel light beams having uniform luminance as incident light to the polarization conversion element 412.

As a whole, the integrator element 411 has a function of adjusting the incident light beams to be applied to the polarization conversion element 412 from the light source optical system 100, to uniform luminance distribution.

The polarization conversion element 412 has a function of uniforming polarization states of light beams incident via the integrator element 411 and the like. For example, this polarization conversion element 412 outputs outputted light including blue light Lb, green light Lg, and red light Lr, through the lens 150 and the like disposed on output side of the light source optical system 100.

The illumination optical system 410 further includes a dichroic mirror 414 and a dichroic mirror 415, a mirror 416, a mirror 417, and a mirror 418, a relay lens 419 and a relay lens 420, a field lens 421R, a field lens 421G; and a field lens 421B, liquid crystal panels 431R, 431G, and 431B serving as the image generator 430, and a dichroic prism 432.

The dichroic mirror 414 and the dichroic mirror 415 have properties of selectively reflecting color light in a predetermined wavelength region and allowing light in wavelength regions other than the predetermined wavelength region to pass therethrough. For example, the dichroic mirror 414 selectively reflects the red light Lr. The dichroic mirror 415 selectively reflects the green light Lg of the green light Lg and the blue light Lb having passed through the dichroic mirror 414. The remaining blue light Lb passes through the dichroic mirror 415. Light (white light Lw) outputted from the light source optical system 100 is thereby separated into a plurality of color light beams of different colors.

The separated red light Lr is reflected by the mirror 416 and passes through the field lens 421R, thereby being made parallel, and then the red light Lr enters the liquid crystal panel 431R for modulation of red light. The green light Lg passes through the field lens 421G; thereby being made parallel, and the green light Lg enters the liquid crystal panel 431G for modulation of green light. The blue light Lb passes through the relay lens 419 and is reflected by the mirror 417, and further passes through the relay lens 420 and is reflected by the mirror 418. The blue light Lb reflected by the mirror 418 passes through the field lens 421B, thereby being made parallel, and then the blue light Lb enters the liquid crystal panel 431B for modulation of blue light Lb.

The liquid crystal panels 431R, 431G, and 431B are electrically coupled to an unillustrated signal source (e.g., a PC or the like) that supplies an image signal including image information. The liquid crystal panels 431R, 431G, and 431B modulate incident light for each pixel, on the basis of supplied image signals of respective colors, thereby generating a red color image, a green image, and a blue image, respectively. The modulated light (the generated images) of respective colors enters the dichroic prism 432 to be combined. The dichroic prism 432 superimposes and thereby combines the light of the respective colors incident from three directions, and outputs thus-combined light toward the projection optical system 500.

The projection optical system 500 includes a plurality of lenses 510 and the like, and applies the light combined by the dichroic prism 432 to the screen 600. A full color image is thereby displayed.

Although the disclosure has been described above with reference to the embodiment and modification examples, the disclosure is not limited thereto, and may be modified in a variety of ways. For example, in the foregoing embodiment, the rotation axes of the rotating cams 21 and 22 are fixed by inserting the pins P2 provided on the base section 11 into the rotation grooves 21A and 22B provided in the rotating cams 21 and 22, but this is not limitative. For example, the cylindrical portion 12G provided in the lens holding section 12 may be used as a rotation axis.

Moreover, in the foregoing embodiment, the components of each of the optical systems are specifically described, but it is not necessary to provide all the components, and any other component may be further included.

It is to be noted that the present disclosure may have the following configurations.

(1)

A lens adjustment mechanism including:

a base section;

a lens holding section that holds a lens having an optical axis in a Z-axis direction;

an intermediate member disposed between the base section and the lens holding section;

a first rotating cam that is disposed between the base section and the intermediate member, and is rotated about an optical axis of the lens, thereby causing the lens holding section to move in a Y-axis direction; and a second rotating cam that is disposed between the intermediate member and the lens holding section, and is rotated about the optical axis of the lens, thereby causing the lens holding section to move in an X-axis direction, in which the intermediate member moves in the Y-axis direction together with the lens holding section during rotation of the first rotating cam, and restricts movement in the Y-axis direction of the lens holding section during rotation of the second rotating cam.

(2)

The lens adjustment mechanism according to (1), in which the lens holding section includes a cylindrical portion having a cylindrical surface in an optical axis direction of the lens, the base section, the intermediate member, the first rotating cam, and the second rotating cam each have an opening into which the cylindrical portion is inserted, and the base section, the intermediate member, the first rotating cam, the second rotating cam, and the lens holding section are coupled to one another.

(3)

The lens adjustment mechanism according to (1) or (2), in which the first rotating cam and the second rotating cam rotate in a plane direction perpendicular to the optical axis of the lens.

(4)

The lens adjustment mechanism according to any one of (1) to (3), in which the intermediate member has a degree of freedom in the X-axis direction and the Y-axis direction.

(5)

The lens adjustment mechanism according to any one of (1) to (4), in which the first rotating cam has a plurality of first rotation grooves along a circumferential direction and a pair of first cam grooves inclined with respect to the circumferential direction.

(6)

The lens adjustment mechanism according to (5), in which the first cam groove guides movement in the Y-axis direction of the intermediate member.

(7)

The lens adjustment mechanism according to (6), in which the intermediate member has a first groove having a long axis in the Y-axis direction and a first pin penetrating the first cam groove.

(8)

The lens adjustment mechanism according to (7), in which the base section has a second pin penetrating the first rotation groove of the first rotating cam, and a third pin penetrating the first groove of the intermediate member and restricting movement in the X-axis direction of the intermediate member.

(9)

The lens adjustment mechanism according to any one of (1) to (8), in which the second rotating cam has a plurality of second rotation grooves along a circumferential direction and a pair of second cam grooves inclined with respect to the circumferential direction.

(10)

The lens adjustment mechanism according to (9), in which the second cam groove guides movement in the X-axis direction of the lens holding section.

(11)

The lens adjustment mechanism according to (10), in which the intermediate member has a second groove having a long axis in the X-axis direction and a fourth pin penetrating the second cam groove.

(12)

The lens adjustment mechanism according to (11), in which the lens holding section has a fifth pin penetrating the second rotation groove of the second rotating cam, and a sixth pin penetrating the second groove of the intermediate member and restricting movement in the Y-axis direction of the intermediate member.

(13)

The lens adjustment mechanism according to any one of (1) to (12), further including a third rotating cam that includes a cylindrical portion having a cylindrical surface in an optical axis direction of the lens, and moves the lens holding section in the Z-axis direction.

(14)

A projection-type display apparatus including:

a light source section;

an image generator that includes a plurality of optical units each including a light modulation element that modulates light from the light source section on the basis of an inputted image signal; and a projection section that projects image light generated in the image generator, the optical units each including:

a base section, a lens holding section that holds a lens having an optical axis in a Z-axis direction, an intermediate member disposed between the base section and the lens holding section, a first rotating cam that is disposed between the base section and the intermediate member, and is rotated about an optical axis of the lens, thereby causing the lens holding section to move in a Y-axis direction, and a second rotating cam that is disposed between the intermediate member and the lens holding section, and is rotated about the optical axis of the lens, thereby causing the lens holding section to move in an X-axis direction, in which the intermediate member moves in the Y-axis direction together with the lens holding section during rotation of the first rotating cam, and restricts movement in the Y-axis direction of the lens holding section during rotation of the second rotating cam.

This application claims the benefit of Japanese Priority Patent Application JP2017-021436 filed with the Japan Patent Office on Feb. 8, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A lens adjustment mechanism comprising:

a base section;

a lens holding section that holds a lens having an optical axis in a Z-axis direction;

an intermediate member disposed between the base section and the lens holding section;

a first rotating cam that is disposed between the base section and the intermediate member, and is rotated about the optical axis of the lens, thereby causing the lens holding section to move in a Y-axis direction; and a second rotating cam that is disposed between the intermediate member and the lens holding section, and is rotated about the optical axis of the lens, thereby causing the lens holding section to move in an X-axis direction, wherein the intermediate member moves in the Y-axis direction together with the lens holding section during rotation of the first rotating cam, and restricts movement in the Y-axis direction of the lens holding section during rotation of the second rotating cam.

2. The lens adjustment mechanism according to claim 1, wherein
the lens holding section includes a cylindrical portion having a cylindrical surface in an optical axis direction of the lens,
the base section, the intermediate member, the first rotating cam, and the second rotating cam each have an opening into which the cylindrical portion is inserted, and
the base section, the intermediate member, the first rotating cam, the second rotating cam, and the lens holding section are coupled to one another.

3. The lens adjustment mechanism according to claim 1, wherein the first rotating cam and the second rotating cam rotate in a plane direction perpendicular to the optical axis of the lens.

4. The lens adjustment mechanism according to claim 1, wherein the intermediate member has a degree of freedom in the X-axis direction and the Y-axis direction.

5. The lens adjustment mechanism according to claim 1, wherein the first rotating cam has a plurality of first rotation grooves along a circumferential direction and a pair of first cam grooves inclined with respect to the circumferential direction.

6. The lens adjustment mechanism according to claim 5, wherein a first cam groove of the pair of first cam grooves guides movement in the Y-axis direction of the intermediate member.

7. The lens adjustment mechanism according to claim 6, wherein the intermediate member has a first groove having a long axis in the Y-axis direction and a first pin penetrating the first cam groove.

8. The lens adjustment mechanism according to claim 7, wherein the base section has a second pin penetrating a first rotation groove of the plurality of first rotation grooves of the first rotating cam, and a third pin penetrating the first groove of the intermediate member and restricting movement in the X-axis direction of the intermediate member.

9. The lens adjustment mechanism according to claim 1, wherein the second rotating cam has a plurality of second rotation grooves along a circumferential direction and a pair of second cam grooves inclined with respect to the circumferential direction.

10. The lens adjustment mechanism according to claim 9, wherein a second cam groove of the pair of second cam grooves guides movement in the X-axis direction of the lens holding section.

11. The lens adjustment mechanism according to claim 10, wherein the intermediate member has a second groove having a long axis in the X-axis direction and a fourth pin penetrating the second cam groove.

12. The lens adjustment mechanism according to claim 11, wherein the lens holding section has a fifth pin penetrating a second rotation groove of the plurality of second rotation grooves of the second rotating cam, and a sixth pin penetrating the second groove of the intermediate member and restricting movement in the Y-axis direction of the intermediate member.

13. The lens adjustment mechanism according to claim 1, further comprising a third rotating cam that includes a cylindrical portion having a cylindrical surface in an optical axis direction of the lens, and moves the lens holding section in the Z-axis direction.

14. A projection-type display apparatus comprising:
a light source section;
an image generator that includes a plurality of optical units each including a light modulation element that modulates light from the light source section on a basis of an inputted image signal; and
a projection section that projects image light generated in the image generator,
the optical units each including:
a base section,
a lens holding section that holds a lens having an optical axis in a Z-axis direction,
an intermediate member disposed between the base section and the lens holding section,
a first rotating cam that is disposed between the base section and the intermediate member, and is rotated about the optical axis of the lens, thereby causing the lens holding section to move in a Y-axis direction, and
a second rotating cam that is disposed between the intermediate member and the lens holding section, and is rotated about the optical axis of the lens, thereby causing the lens holding section to move in an X-axis direction, wherein
the intermediate member moves in the Y-axis direction together with the lens holding section during rotation of the first rotating cam, and restricts movement in the Y-axis direction of the lens holding section during rotation of the second rotating cam.

* * * * *